United States Patent
Lin

(10) Patent No.: US 11,095,697 B2
(45) Date of Patent: Aug. 17, 2021

(54) ETHERNET-BASED CASCADING CONFERENCE PHONE DEVICE AND METHOD

(71) Applicant: YEALINK (XIAMEN) NETWORK TECHNOLOGY CO., LTD., Xiamen (CN)

(72) Inventor: Wenhui Lin, Xiamen (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 133 days.

(21) Appl. No.: 16/596,787

(22) Filed: Oct. 9, 2019

(65) Prior Publication Data
US 2020/0145467 A1    May 7, 2020

(30) Foreign Application Priority Data

Nov. 1, 2018 (CN) .......................... 201811294742.4

(51) Int. Cl.
*H04L 29/06* (2006.01)
*H04L 7/00* (2006.01)
*H04L 12/26* (2006.01)

(52) U.S. Cl.
CPC .......... *H04L 65/403* (2013.01); *H04L 7/0041* (2013.01); *H04L 43/087* (2013.01)

(58) Field of Classification Search
CPC .... H04L 65/403; H04L 7/0041; H04L 43/087
See application file for complete search history.

(56) References Cited

U.S. PATENT DOCUMENTS 9,258,073 B2    2/2016 Le Pallec
2007/0258550 A1  11/2007 Wang

FOREIGN PATENT DOCUMENTS

| CN | 102035639 A | 4/2011 |
|---|---|---|
| CN | 103339888 A | 10/2013 |
| CN | 103763055 A | 4/2014 |
| EP | 2312776 A1 | 4/2011 |

OTHER PUBLICATIONS

Montgomert W A: "Techniques for Packet Voice Synchronization", IEEE Jounral on Selected Areas in Communications, IEEE Service Center, Piscataway, US, vol. SAC-01, No. 6, Dec. 31, 1983, pp. 1022-1028, XP000563228, ISSN: 0733-8716.

*Primary Examiner* — Jeffrey M Rutkowski
*Assistant Examiner* — Chae S Lee
(74) *Attorney, Agent, or Firm* — Gang Yu

(57) ABSTRACT

The present disclosure discloses an Ethernet-based cascading conference phone device, which includes a master conference phone and a slave conference phone. The master conference phone receives at least one network data packet through an Ethernet, obtains a real-time stream signal according to the at least one network data packet, plays the real-time stream signal after a delay, sends the real-time stream signal to the slave conference phone, periodically sends at least one synchronized broadcast packet to the slave conference phone. The slave conference phone receives the at least one synchronized broadcast packet, receives the real-time stream signal, calculates a master-slave clock offset according to the at least one synchronized broadcast packet, performs linear compensation on the real-time stream signal according to the master-slave clock offset to obtain a compensation real-time stream signal, plays the compensation real-time stream signal and sends the real-time stream signal to the master conference phone.

10 Claims, 2 Drawing Sheets

ETHERNET-BASED CASCADING CONFERENCE PHONE DEVICE AND METHOD

TECHNICAL FIELD

The present disclosure relates to the field of conference phones, and in particular to an Ethernet-based cascading conference phone device and a method for the Ethernet-based cascading conference phone device.

BACKGROUND

If only one conference phone is arranged in a large conference room, a pick-up and playback range of this conference phone is limited and a conference requirement may not be met. Therefore, a conference phone cascading solution is required to extend the pick-up and playback range. However, a big problem for cascading of different devices is that factors such as a crystal oscillator manufacturing process and an environmental temperature may cause clock offsets between different devices, thereby affecting speech quality, echo cancellation and duplexing effects and the like.

According to an Ethernet cascading solution in a related art, a problem of clock asynchronization of multiple devices is usually solved on a hardware chip. For example, for a CobraNet device, a dedicated CobraNet chip is adopted. A master device periodically generates a standard clock and transmits a clock signal to a slave device through a CobraNet Ethernet transmission protocol. And the slave device extracts the clock signal transmitted by the master device from at least one protocol packet and calibrates a local clock on hardware, thereby achieving an effect of synchronization with the master device.

Thus, it can be seen that the problem of clock asynchronization in the related art mostly depend on dedicated hardware and are limited in chip selection and not universal, and the same arts may not be implemented on other chips. Therefore, there is a practical need for a method by which problems of clock offsets of multiple conference phones, network jitter, asynchronous playing and the like may be solved without depending on the dedicated hardware, so that this method can be applied to different chip solutions.

SUMMARY

At least some embodiments of present disclosure provide an Ethernet-based cascading conference phone device and a method for the Ethernet-based cascading conference phone device, so as at least to partially solve a problem that clock asynchronization of multiple devices in the related art usually depends on dedicated hardware and the dedicated hardware limits in chip selection and is lack of universality.

An embodiment of the present disclosure provides an Ethernet-based cascading conference phone device, which includes a master conference phone and a slave conference phone.

The master conference phone is configured to receive at least one network data packet through an Ethernet, obtain a real-time stream signal according to the at least one network data packet, play the real-time stream signal after a delay, send the real-time stream signal to the slave conference phone, periodically send at least one synchronized broadcast packet to the slave conference phone, receives a real-time stream signal sent by the slave conference phone, select a master signal from the real-time stream signal sent by the slave conference phone, obtain at least one network data packet according to the master signal and send the at least one network data packet through the Ethernet.

The slave conference phone is configured to receive the at least one synchronized broadcast packet, receive the real-time stream signal sent by the master conference phone, calculates a master-slave clock offset according to the at least one synchronized broadcast packet, perform linear compensation on the real-time stream signal sent by the master conference phone according to the master-slave clock offset to obtain a compensation real-time stream signal, play the compensation real-time stream signal and send the real-time stream signal to the master conference phone.

Compared with the related art, the Ethernet-based cascading conference phone device disclosed in the present disclosure has the advantages that the master conference phone periodically sends the at least one synchronized broadcast packet to the slave conference phone and the slave conference phone calculates the master-slave clock offset according to the at least one synchronized broadcast packet, performs linear compensation on the real-time stream signal sent by the master conference phone according to the master-slave clock offset to obtain the compensation real-time stream signal and plays the compensation real-time stream signal. According to the cascading conference phone device of the present disclosure, clock synchronization between the master conference phone and the slave conference phone is not implemented based on hardware, and instead, the clock offset is calculated and linear compensation is performed on the real-time stream signal sent by the master conference phone according to the clock offset to linearly extend or compress a signal to compensate influence brought to call quality by the clock offset. In the present disclosure, clock synchronization elements are arranged on both the master conference phone and the slave conference phone, but clocks of the master conference phone and the slave conference phone are not regulated to be synchronized, and the clock synchronization element of the present disclosure is mainly configured to calculate the clock offset to linearly extend or compress the signal to compensate the clock offset. According to the present disclosure, the technical limit that, for existing cascading conference phones, clock synchronization between the master conference phone and the slave conference phone is implemented based on hardware is broken, the problem that clock asynchronization of multiple devices in the related art usually depends on dedicated hardware and the dedicated hardware limits in chip selection and is lack of universality is solved, linear extension or compression of the real-time stream signal for compensation of the influence brought by the clock offset is proposed, and the master conference phone and the slave conference phone are not to implement clock synchronization but only to implement playing synchronization by signal compensation. According to the present disclosure, the clock offset is calculated to solve the problems of clock offsets of multiple conference phones, network jitter and asynchronous playing. Above all, according to the Ethernet-based cascading conference phone device of the present disclosure, the problem that clock asynchronization of multiple devices in the related art usually depends on dedicated hardware and the dedicated hardware limits in chip selection and is lack of universality is solved, and the cascading conference phone device is provided to solve the problems of clock offsets of multiple conference phones, network jitter, asynchronous playing and the like independently of hardware clock synchronization.

Another embodiment of the present disclosure provides a method for an Ethernet-based cascading conference phone device, which includes a playback step and a pick-up step, and the playback step includes:

a master conference phone receiving at least one network data packet through an Ethernet and obtaining a real-time stream signal according to the at least one network data packet, sending the real-time stream signal to a slave conference phone and periodically sending at least one synchronized broadcast packet to the slave conference phone;

the slave conference phone receiving the real-time stream signal sent by the master conference phone and the at least one synchronized broadcast packet, calculating a master-slave clock offset according to the at least one synchronized broadcast packet and performing linear compensation on the real-time stream signal sent by the master conference phone according to the master-slave clock offset to obtain a compensation real-time stream signal;

the master conference phone playing the real-time stream signal after a delay, and the slave conference phone playing the compensation real-time stream signal;

the pick-up step includes:

the master conference phone picking up at least one environmental sound to obtain the real-time stream signal and sending the real-time stream signal to the master conference phone;

the master conference phone picking up at least one environmental sound to obtain the real-time stream signal and receiving the real-time stream signal sent by the slave conference phone; and the master conference phone selecting a master signal, obtaining the at least one network data packet according to the master signal and sending the at least one network data packet through the Ethernet.

Compared with the related art, the Ethernet-based cascading conference phone method disclosed in the present disclosure has the advantages that the master conference phone periodically sends the at least one synchronized broadcast packet to the slave conference phone and the slave conference phone calculates the master-slave clock offset according to the at least one synchronized broadcast packet, performs linear compensation on the real-time stream signal sent by the master conference phone according to the master-slave clock offset to obtain the compensation real-time stream signal and plays the compensation real-time stream signal. According to the cascading conference phone device of the present disclosure, clock synchronization between the master conference phone and the slave conference phone is not implemented based on hardware, and instead, the clock offset is calculated and linear compensation is performed on the real-time stream signal sent by the master conference phone according to the clock offset to linearly extend or compress a signal to compensate influence brought to call quality by the clock offset. In the present disclosure, clock synchronization elements are arranged on both the master conference phone and the slave conference phone, but clocks of the master conference phone and the slave conference phone are not regulated to be synchronized, and the clock synchronization element of the present disclosure is mainly configured to calculate the clock offset to linearly extend or compress the signal to compensate the clock offset. According to the present disclosure, the technical limit that, for existing cascading conference phones, clock synchronization between the master conference phone and the slave conference phone is implemented based on hardware is broken, the problem that clock asynchronization of multiple devices in the related art usually depends on dedicated hardware and the dedicated hardware limits in chip selection and is lack of universality is solved, linear extension or compression of the real-time stream signal for compensation of the influence brought by the clock offset is proposed, and the master conference phone and the slave conference phone are not to implement clock synchronization but only to implement playing synchronization by signal compensation. According to the present disclosure, the clock offset is calculated to solve the problems of clock offsets of multiple conference phones, network jitter and asynchronous playing. Above all, according to the Ethernet-based cascading conference phone device of the present disclosure, the problem that clock asynchronization of multiple devices in the related art usually depends on dedicated hardware and the dedicated hardware limits in chip selection and is lack of universality is solved, and the cascading conference phone device is provided to solve the problems of clock offsets of multiple conference phones, network jitter, asynchronous playing and the like independently of hardware clock synchronization and may be applied to different chip solutions.

DETAILED DESCRIPTION

Figure 1:
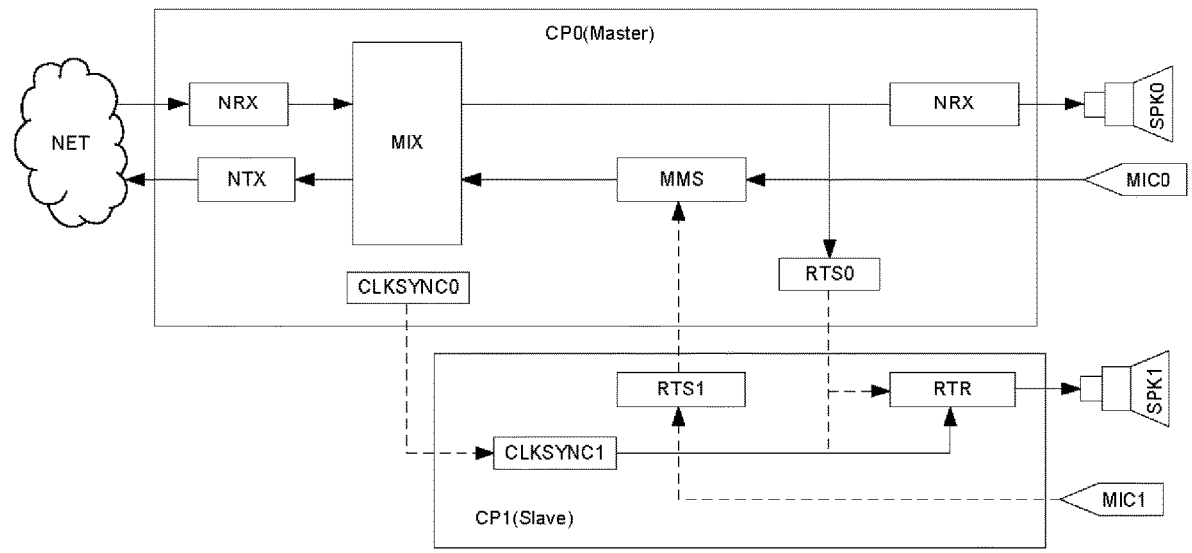
FIG. 1 is a structural schematic diagram of an Ethernet-based cascading conference phone device according to an embodiment of the present disclosure.

As shown in FIG. 1, an Ethernet-based cascading conference phone device of the present disclosure includes a master conference phone CP0 and a slave conference phone CP1. The master conference phone CP0 receives at least one network data packet through the Ethernet, obtains a real-time stream signal according to the at least one network data packet, plays the real-time stream signal after a delay, sends the real-time stream signal to the slave conference phone CP1, periodically sends at least one synchronized broadcast packet to the slave conference phone CP1, receives a real-time stream signal sent by the slave conference phone, selects a master signal from the real-time stream signal sent by the slave conference phone, obtains at least one network data packet according to the master signal and sends the at least one network data packet through the Ethernet. The slave conference phone CP1 receives the at least one synchronized broadcast packet, receives the real-time stream signal sent by the master conference phone, calculates a master-slave clock offset according to the at least one synchronized broadcast packet, performs linear compensation on the real-time stream signal sent by the master conference phone according to the master-slave clock offset to obtain a compensation real-time stream signal, plays the compensation real-time stream signal and sends the real-time stream signal to the master conference phone CP0.

Compared with the related art, the Ethernet-based cascading conference phone device disclosed in the present disclosure has the advantages that the master conference phone CP0 periodically sends the at least one synchronized broadcast packet to the slave conference phone CP1 and the slave conference phone CP1 calculates the master-slave clock offset according to the at least one synchronized broadcast packet, performs linear compensation on the real-time stream signal sent by the master conference phone according to the master-slave clock offset to obtain the compensation real-time stream signal and plays the compensation real-time stream signal. According to the cascading conference phone device of the present disclosure, clock synchronization between the master conference phone CP0 and the slave conference phone CP1 is not implemented based on hardware, and instead, the clock offset is calculated and linear compensation is performed on the real-time stream signal sent by the master conference phone according to the clock offset to linearly extend or compress a signal to compensate influence brought to call quality by the clock offset. In the present disclosure, clock synchronization elements are arranged on both the master conference phone and the slave conference phone CP1, but clocks of the master conference phone and the slave conference phone CP1 are not be regulated to be synchronized, and the clock synchronization element of the present disclosure is mainly configured to calculate the clock offset to linearly extend or compress the signal to compensate the clock offset. According to the present disclosure, the technical limit that, for existing cascading conference phones, clock synchronization between the master conference phone and the slave conference phone CP1 is implemented based on hardware is broken, the problem that clock asynchronization of multiple devices in the related art usually depends on dedicated hardware and the dedicated hardware limits in chip selection and is lack of universality is solved, linear extension or compression of the real-time stream signal for compensation of the influence brought by the clock offset is proposed, and the master conference phone and the slave conference phone CP1 are not to implement clock synchronization but only to implement playing synchronization by signal compensation. According to the present disclosure, the clock offset is calculated to solve the problems of clock offsets of multiple conference phones, network jitter and asynchronous playing. Above all, according to the Ethernet-based cascading conference phone device of the present disclosure, the problem that clock asynchronization of multiple devices in the related art usually depends on dedicated hardware and the dedicated hardware limits in chip selection and is lack of universality is solved, and the cascading conference phone device is provided to solve the problems of clock offsets of multiple conference phones, network jitter, asynchronous playing and the like independently of hardware clock synchronization.

As shown in FIG. 1, the master conference phone CP0 includes a network data packet receiver NRX, a network data packet sender NTX, a master clock synchronization element CLKSYNC0, a frequency mixing element MIX, a selection element MMS, a master real-time stream sending element RTS0, a delay element DELAY, a master pick-up element MIC0 and a master playback element SPK0. The network data packet receiver NRX receives the at least one network data packet through the Ethernet. The network data packet sender NTX sends the at least one network data packet through the Ethernet. The master clock synchronization element CLKSYNC0 periodically sends the at least one synchronized broadcast packet to the slave conference phone CP1. The frequency mixing element MIX converts the real-time stream signal into the at least one network data packet, sends the at least one network data packet to the network data packet sender NTX, and converts the at least one network data packet into a real-time stream signal and sends this real-time stream signal to the delay element DELAY. The selection element MMS receives the real-time stream signal sent by the master pick-up element MIC0, receives the real-time stream signal sent by the slave conference phone CP1, selects the master signal and sends the master signal to the frequency mixing element MIX. The delay element DELAY receives the real-time stream signal sent by the frequency mixing element and forwards the real-time stream signal sent by the frequency mixing element to the master playback element after a delay. The master playback element SPK0 plays the real-time stream signal sent by delay element. The master pick-up element MIC0 picks up at least one environmental sound to generate the real-time stream signal and sends the real-time stream signal to the selection element MMS. The selection element in an embodiment of the present disclosure determines a signal with maximum effective energy in received signals as the master signal and determines a corresponding pick-up element as a present pick-up element.

As shown in FIG. 1, the slave conference phone CP1 includes a slave clock synchronization element CLKSYNC1, a slave real-time stream sending element RTS1, a real-time stream receiving element RTR, a slave pick-up element MIC1 and a slave playback element SPK1. The slave clock synchronization element CLKSYNC1 receives the at least one synchronized broadcast packet, calculates the master-slave clock offset according to the at least one synchronized broadcast packet and sends the master-slave clock offset to the real-time stream receiving element RTR. The real-time stream receiving element RTR receives the master-slave clock offset and the real-time stream signal, performs linear compensation on the received real-time stream signal according to the master-slave clock offset to obtain the compensation real-time stream signal and sends the compensation real-time stream signal to the slave playback element SPK1. The slave real-time stream sending element RTS1 receives the real-time stream signal sent by the slave pick-up element MIC1 and forwards the real-time stream signal sent by the slave pick-up element to the master conference phone CP0. The slave playback element SPK1 receives and plays the compensation real-time stream signal. The slave pick-up element MIC1 picks up at least one environmental sound to generate the real-time stream signal and sends the real-time stream signal to the slave real-time stream sending element RTS1.

Figure 2:
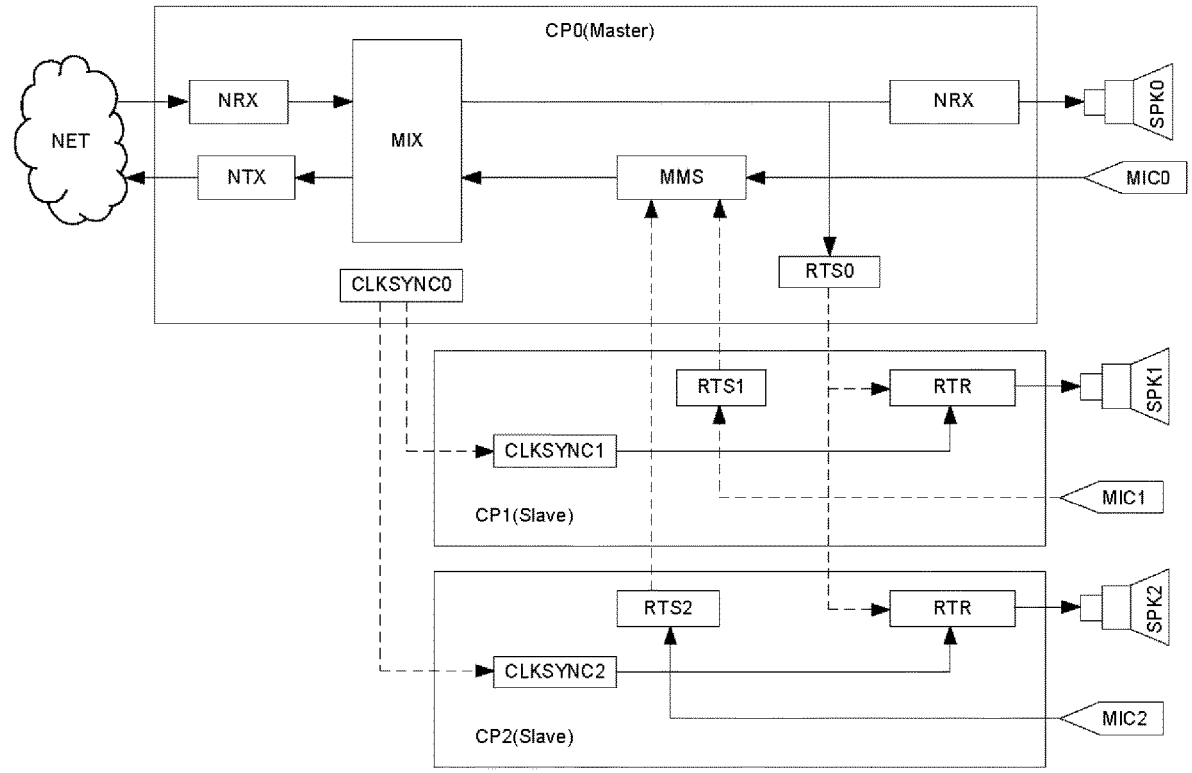
FIG. 2 is a structural schematic diagram of an Ethernet-based cascading conference phone device according to another embodiment of the present disclosure.

As shown in FIG. 2, in the Ethernet-based cascading conference phone device of the present disclosure, the number of slave conference phones is more than one. According to the present disclosure, there are multiple slave conference phones, so that a relatively good pick-up and playback effect and applicability to a relatively large conference scenario may be achieved. In an embodiment of the present disclosure, there are two slave conference phones, i.e., a slave conference phone CP1 and a slave conference phone CP2.

A method for an Ethernet-based cascading conference phone device of the present disclosure includes a playback step and a pick-up step.

The playback step may be implemented as follows. A master conference phone CP0 receives at least one network data packet through an Ethernet and obtains a real-time stream signal according to the at least one network data packet. The master conference phone CP0 sends the real-time stream signal to a slave conference phone CP1 and periodically sends at least one synchronized broadcast packet to the slave conference phone CP1. The slave conference phone CP1 receives the real-time stream signal sent by the master conference phone and the at least one synchronized broadcast packet, calculates a master-slave clock offset according to the at least one synchronized broadcast packet and performs linear compensation on the received real-time stream signal sent by the master conference phone according to the master-slave clock offset to obtain a compensation real-time stream signal. The master conference phone CP0 plays the real-time stream signal after a delay, and the slave conference phone CP1 plays the compensation real-time stream signal.

The pick-up step may be implemented as follows. The master conference phone CP1 picks up at least one environmental sound to obtain the real-time stream signal and sends the real-time stream signal to the master conference phone. The master conference phone CP0 picks up at least one environmental sound to obtain the real-time stream signal and receives the real-time stream signal sent by the slave conference phone CP1. And the master conference phone CP0 selects a master signal, obtains the at least one network data packet according to the master signal and sends the at least one network data packet through the Ethernet.

Compared with the related art, the Ethernet-based cascading conference phone method disclosed in the present disclosure has the advantages that the master conference phone CP0 periodically sends the at least one synchronized broadcast packet to the slave conference phone CP1 and the slave conference phone CP1 calculates the master-slave clock offset according to the at least one synchronized broadcast packet, performs linear compensation on the real-time stream signal sent by the master conference phone according to the master-slave clock offset to obtain the compensation real-time stream signal and plays the compensation real-time stream signal. According to the cascading conference phone device of the present disclosure, clock synchronization between the master conference phone CP0 and the slave conference phone CP1 is not implemented based on hardware, and instead, the clock offset is calculated and linear compensation is performed on the real-time stream signal sent by the master conference phone according to the clock offset to linearly extend or compress a signal to compensate influence brought to call quality by the clock offset. In the present disclosure, clock synchronization elements are arranged on both the master conference phone and the slave conference phone CP1, but clocks of the master conference phone and the slave conference phone CP1 are not be regulated to be synchronized, and the clock synchronization element of the present disclosure is mainly configured to calculate the clock offset to linearly extend or compress the signal to compensate the clock offset. According to the present disclosure, the technical limit that, for existing cascading conference phones, clock synchronization between the master conference phone and the slave conference phone CP1 is implemented based on hardware is broken, the problem that clock asynchronization of multiple devices in the related art usually depends on dedicated hardware and the dedicated hardware limits in chip selection and is lack of universality is solved, linear extension or compression of the real-time stream signal for compensation of the influence brought by the clock offset is proposed, and the master conference phone and the slave conference phone CP1 are not to implement clock synchronization but only to implement playing synchronization by signal compensation. According to the present disclosure, the clock offset is calculated to solve the problems of clock offsets of multiple conference phones, network jitter and asynchronous playing. Above all, according to the Ethernet-based cascading conference phone device of the present disclosure, the problem that clock asynchronization of multiple devices in the related art usually depends on dedicated hardware and the dedicated hardware limits in chip selection and is lack of universality is solved, and the Ethernet-based cascading conference phone method is provided to solve the problems of clock offsets of multiple conference phones, network jitter, asynchronous playing and the like independently of hardware clock synchronization and may be applied to different chip solutions.

According to the method for the Ethernet-based cascading conference phone device of the present disclosure, the operation that the master-slave clock offset is calculated includes the following steps. At a sampling point collection step, a sending time point, a receiving time point, a master-slave time offset and an average sending delay are acquired and the acquired data is set as sampling points and transmitted to a sampling point first in first out queue FIFO. At an abnormal sampling point filtering step, an average sending delay jitter of all samples is calculated, a sending delay jitter of each sample is traversed, and when a difference value between the sending delay jitter of a sample and the average sending delay jitter is not within a jitter threshold, this sample is filtered. At a linear fitting frequency offset estimation step, linear fitting is performed on the samples based on a time offset to estimate a frequency offset. At a state determination step, a current frequency offset estimation state is determined according to frequency offset calculation results of multiple processing periods. And at a clock offset estimation step, an estimated clock offset result is acquired according to the current frequency offset estimation state.

According to the method for the Ethernet-based cascading conference phone device of the present disclosure, the sampling point collection step further includes a preliminary sample filtering step. At the preliminary sample filtering step, a bidirectional average delay jitter of the samples is calculated to filter at least some samples. In an embodiment of the present disclosure, the bidirectional average delay jitter of the samples is calculated to filter the samples, so that influence brought by the sending delay jitter to frequency offset estimation can be reduced as much as possible.

According to the method for the Ethernet-based cascading conference phone device of the present disclosure, the average sending delay jitter is a sending delay standard deviation, and the jitter threshold is the average sending delay jitter.

According to the method for the Ethernet-based cascading conference phone device of the present disclosure, a state at the state determination step includes an unstable state, a locked state and a stable state, and the state determination step may be implemented as follows. It is determined as a default that the sampling points entering the sampling point first in first out queue are in the unstable state, the sampling points are continuously transmitted to the sampling point first in first out queue without discarding any data, a frequency offset in each processing period is calculated, and whether a condition of entering the locked state or the stable state is met or not is determined. When the condition of entering the locked state is met, the sampling points are continuously transmitted to the sampling point first in first out queue without discarding any data, the frequency offset in each processing period is calculated, whether the condition of entering the stable state is met or not is determined, and when the condition of entering the stable state is met, a period number in the stable state is obtained. And when the condition of entering the stable state is met, the sampling point first in first out queue FIFO is continuously extended forwards along with transmission of the sampling points to the sampling point first in first out queue in each processing period, and the frequency offset of the sampling points in the last number of processing periods in the stable state is iteratively calculated.

According to the method for the Ethernet-based cascading conference phone device of the present disclosure, when a maximum processing period number is exceeded and the condition of entering the stable state is not met, a long-term stable running mode is internally entered automatically, and the sampling point first in first out queue FIFO is continuously extended forwards by use of the maximum processing period number.

Figure 3:
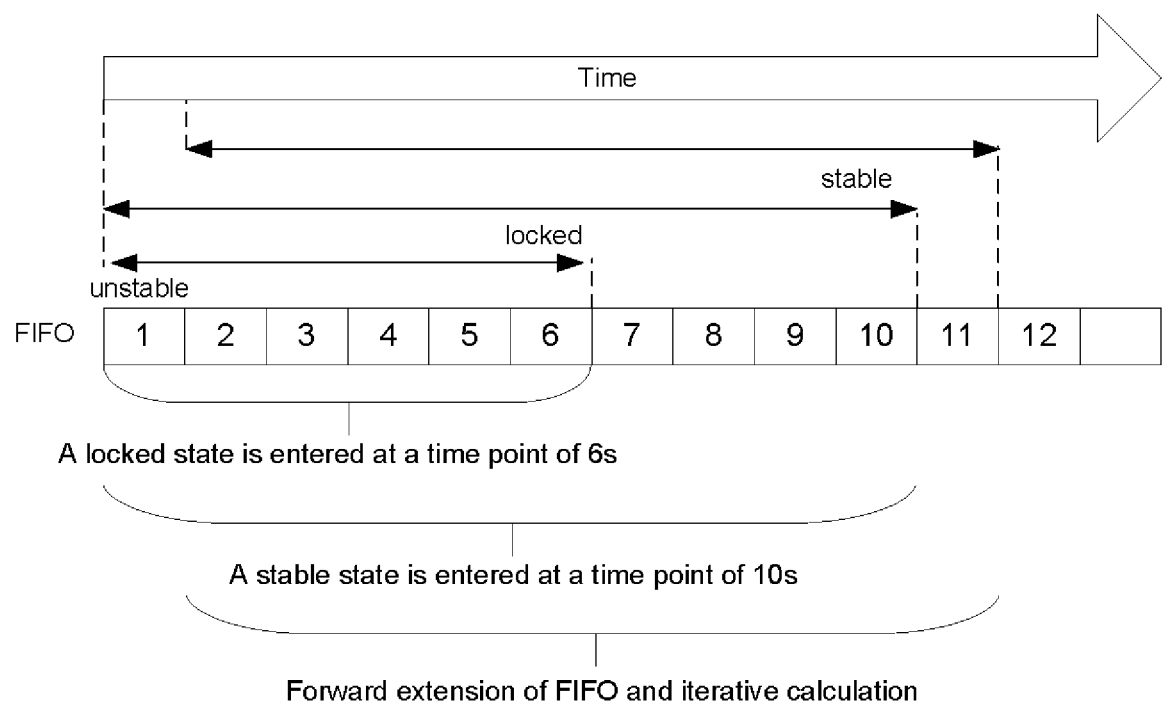
FIG. 3 is a schematic diagram of state determination of a method for an Ethernet-based cascading conference phone device according to an embodiment of the present disclosure.

As shown in FIG. 3, the state determination step of the present disclosure will be introduced with a specific embodiment.

The state is divided into the unstable, locked and stable states, and the current frequency offset estimation state is determined according to the frequency offset calculation results of the multiple processing periods.

A determination principle is as follows. When an estimated frequency offset jitter is within a ppm threshold value of the corresponding state and frequency offset credibility meets a threshold requirement in N continuous processing periods, the corresponding state may be entered, and the ppm threshold values of the locked and stable states are differentiated.

A processing flow for the unstable state is as follows. The sampling points are continuously transmitted to the sampling point first in first out queue without discarding any data, the frequency offset in each processing period is calculated, and whether the condition of entering the locked or stable state is met or not is determined. For example, in the figure, the locked state is entered at a time point of 6s.

A processing flow for the locked state is as follows. The sampling points are continuously transmitted to the sampling point first in first out queue without discarding any data, the frequency offset in each processing period is calculated, whether the condition of entering the stable state is met or not is determined, and when the condition of entering the stable state is met, the period number in the stable state is obtained. As shown in FIG. 3, when the stable state is entered at a time point of 10s, the stable processing period number is 10, and this processing number reflects the number of samples required by estimation of a stable result.

A processing flow in the stable state is as follows. FIFO is continuously extended forwards along with transmission of the sampling points to the sampling point first in first out queue in each processing period, and the frequency offset of the samples in the last number of stable processing periods is alternatively calculated, i.e., the frequency offset of the samples in last 10 s, as shown in FIG. 3. In addition, it may be configured that processing is performed at an interval of CLKSYNC_STABLE_PERIOD processing periods to reduce a calculated amount after the stable state.

The above are exemplary implementation modes of the present disclosure. It is to be pointed out that those of ordinary skill in the art may further make multiple improvements and embellishments without departing from the principle of the present disclosure and these improvements and embellishments shall fall within the scope of protection of the present disclosure.

What is claimed is:

1. An Ethernet-based cascading conference phone device, comprising a master conference phone and a slave conference phone;
   the master conference phone, configured to receive at least one network data packet through an Ethernet, obtain a real-time stream signal according to the at least one network data packet, play the real-time stream signal after a delay, send the real-time stream signal to the slave conference phone, periodically send at least one synchronized broadcast packet to the slave conference phone, receives a real-time stream signal sent by the slave conference phone, select a master signal from the real-time stream signal sent by the slave conference phone, obtain at least one network data packet according to the master signal and send the at least one network data packet through the Ethernet; and
   the slave conference phone, configured to receive the at least one synchronized broadcast packet, receive the real-time stream signal sent by the master conference phone, calculates a master-slave clock offset according to the at least one synchronized broadcast packet, perform linear compensation on the real-time stream signal sent by the master conference phone according to the master-slave clock offset to obtain a compensation real-time stream signal, play the compensation real-time stream signal and send the real-time stream signal to the master conference phone.

2. The Ethernet-based cascading conference phone device as claimed in claim 1, wherein the master conference phone comprises a network data packet receiver, a network data packet sender, a master clock synchronization element, a frequency mixing element, a selection element, a master real-time stream sending element, a delay element, a master pick-up element and a master playback element; wherein
   the network data packet receiver is configured to receive the at least one network data packet through the Ethernet;
   the network data packet sender is configured to send the at least one network data packet through the Ethernet;
   the master clock synchronization element is configured to periodically send the at least one synchronized broadcast packet to the slave conference phone;
   the frequency mixing element is configured to convert the real-time stream signal into the at least one network data packet, send the at least one network data packet to the network data packet sender, and convert at least one received network data packet into a real-time stream signal and send this real-time stream signal to the delay element;
   the selection element is configured to receive the real-time stream signal sent by the master pick-up element, receive the real-time stream signal sent by the slave conference phone, select the master signal and send the master signal to the frequency mixing element;
   the delay element is configured to receive the real-time stream signal sent by the frequency mixing element and forward the real-time stream signal sent by the frequency mixing element to the master playback element after a delay;
   the master playback element is configured to play the real-time stream signal sent by delay element; and
   the master pick-up element is configured to pick up at least one environmental sound to generate the real-time stream signal and sends the real-time stream signal to the selection element.

3. The Ethernet-based cascading conference phone device as claimed in claim 1, wherein the slave conference phone comprises a slave clock synchronization element, a slave real-time stream sending element, a real-time stream receiving element, a slave pick-up element and a slave playback element;
   the slave clock synchronization element is configured to receive the at least one synchronized broadcast packet, calculate the master-slave clock offset according to the at least one synchronized broadcast packet and send the master-slave clock offset to the real-time stream receiving element;
   the real-time stream receiving element is configured to receive the master-slave clock offset and the real-time stream signal, performs linear compensation on the real-time stream signal according to the master-slave clock offset to obtain the compensation real-time stream signal and send the compensation real-time stream signal to the slave playback element;
   the slave real-time stream sending element is configured to receive the real-time stream signal sent by the slave pick-up element and forwards the real-time stream signal sent by the slave pick-up element to the master conference phone;
   the slave playback element is configured to receive and play the compensation real-time stream signal; and
   the slave pick-up element is configured to pick up at least one environmental sound to generate the real-time stream signal and send the real-time stream signal to the slave real-time stream sending element.

4. The Ethernet-based cascading conference phone device as claimed in claim 1, wherein the number of slave conference phones is more than one.

5. A method for an Ethernet-based cascading conference phone device, comprising a playback step and a pick-up step, wherein
   the playback step comprises:
   a master conference phone receiving at least one network data packet through an Ethernet and obtaining a real-time stream signal according to the at least one network data packet, sending the real-time stream signal to a slave conference phone and periodically sending at least one synchronized broadcast packet to the slave conference phone;
   the slave conference phone receiving the real-time stream signal sent by the master conference phone and the at least one synchronized broadcast packet, calculating a master-slave clock offset according to the at least one synchronized broadcast packet and performing linear compensation on the real-time stream signal sent by the master conference phone according to the master-slave clock offset to obtain a compensation real-time stream signal;
   the master conference phone playing the real-time stream signal after a delay, and the slave conference phone playing the compensation real-time stream signal;
   the pick-up step comprises:
   the master conference phone picking up at least one environmental sound to obtain the real-time stream signal and sending the real-time stream signal to the master conference phone;
   the master conference phone picking up at least one environmental sound to obtain the real-time stream signal and receiving the real-time stream signal sent by the slave conference phone; and
   the master conference phone selecting a master signal, obtaining the at least one network data packet according to the master signal and sending the at least one network data packet through the Ethernet.

6. The method for the Ethernet-based cascading conference phone device as claimed in claim 5, wherein calculating the master-slave clock offset comprises the following steps:
   at a sampling point collection step, acquiring a sending time point, a receiving time point, a master-slave time offset and an average sending delay, setting acquired data as sampling points and transmitting the acquired data to a sampling point first in first out queue;
   at an abnormal sampling point filtering step, calculating an average sending delay jitter of all samples, traversing a sending delay jitter of each sample, and when a difference value between the sending delay jitter of a sample and the average sending delay jitter is not within a jitter threshold, filtering this sample;
   at a linear fitting frequency offset estimation step, performing linear fitting on samples based on a time offset to estimate a frequency offset;
   at a state determination step, determining a current frequency offset estimation state according to frequency offset calculation results of a plurality of processing periods; and
   at a clock offset estimation step, acquiring an estimated clock offset result according to the current frequency offset estimation state.

7. The method for the Ethernet-based cascading conference phone device as claimed in claim 6, wherein the sampling point collection step further comprises a preliminary sample filtering step, and at the preliminary sample filtering step, a bidirectional average delay jitter of the samples is calculated to filter at least some samples.

8. The method for the Ethernet-based cascading conference phone device as claimed in claim 6, wherein the average sending delay jitter is a sending delay standard deviation, and the jitter threshold is the average sending delay jitter.

9. The method for the Ethernet-based cascading conference phone device as claimed in claim 6, wherein a state at the state determination step comprises an unstable state, a locked state and a stable state, and the state determination step comprises:
   determining as a default that the sampling points entering the sampling point first in first out queue are in the unstable state, continuously transmitting the sampling points to the sampling point first in first out queue without discarding any data, calculating a frequency offset in each processing period, and determining whether a condition of entering the locked state or the stable state is met or not;
   when the condition of entering the locked state is met, continuously transmitting the sampling points to the sampling point first in first out queue without discarding any data, calculating the frequency offset in each processing period, determining whether the condition of entering the stable state is met or not, and when the condition of entering the stable state is met, obtaining a period number in the stable state; and
   when the condition of entering the stable state is met, continuously extending the sampling point first in first out queue forwards along with transmission of the sampling points to the sampling point first in first out queue in each processing period, and iteratively calculating the frequency offset of the sampling points in the last number of processing periods in the stable state.

10. The method for the Ethernet-based cascading conference phone device as claimed in claim 9, wherein when a maximum processing period number is exceeded and the condition of entering the stable state is not met, a long-term stable running mode is internally entered automatically, and the sampling point first in first out queue is continuously extended forwards by use of the maximum processing period number.

* * * * *